Aug. 7, 1928. 1,679,372
F. F. PEASE
GRADING AND SORTING APPARATUS
Original Filed April 4, 1923 3 Sheets-Sheet 1
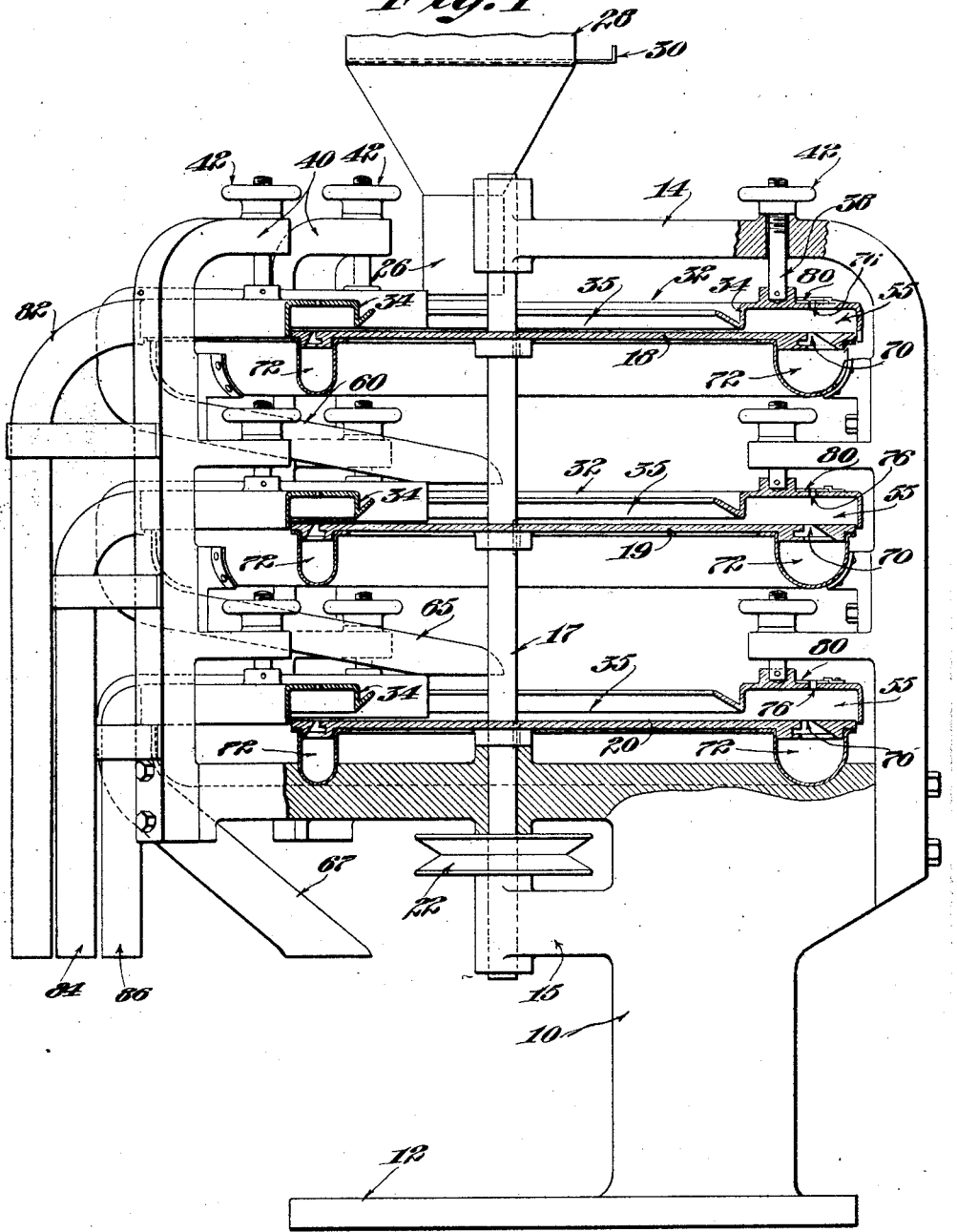

Aug. 7, 1928.
F. F. PEASE
1,679,372
GRADING AND SORTING APPARATUS
Original Filed April 4, 1923   3 Sheets-Sheet 2
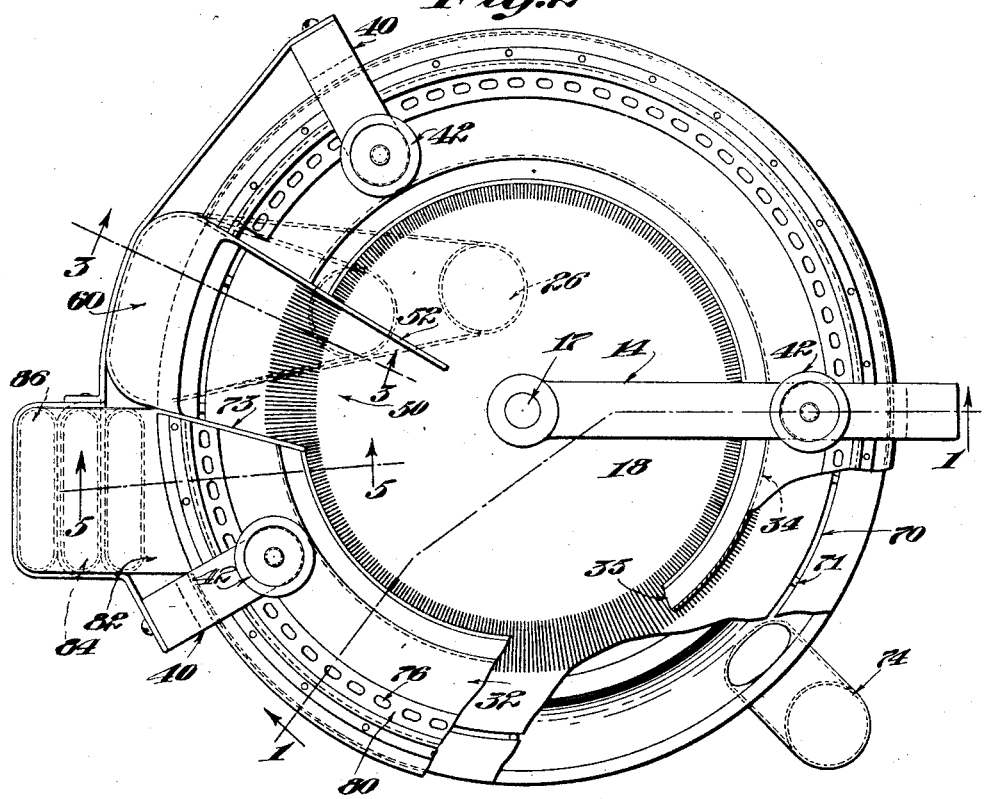
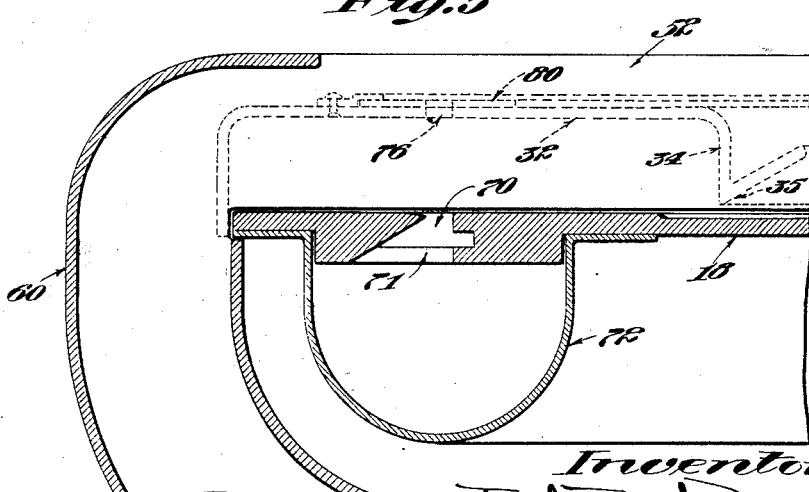

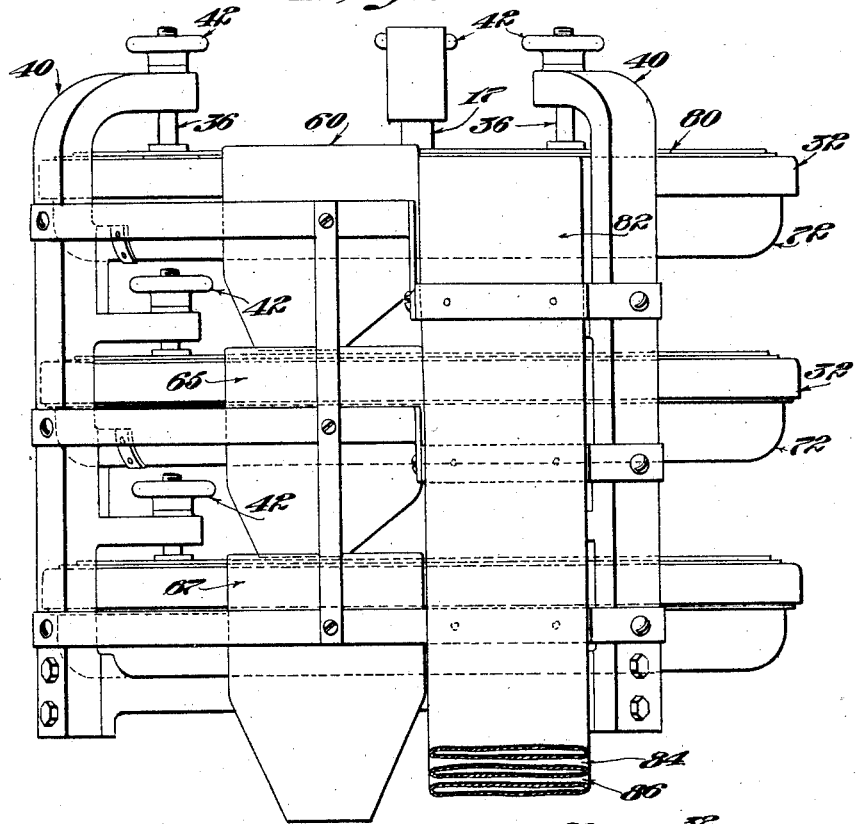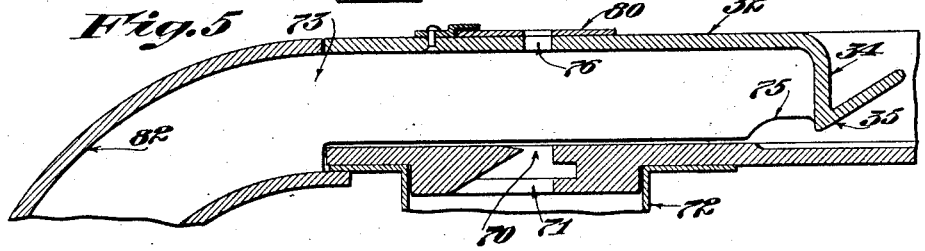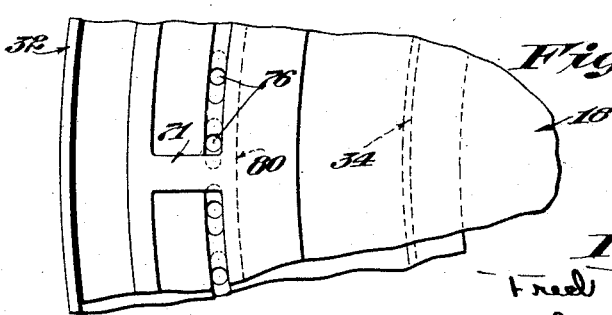

Patented Aug. 7, 1928.

1,679,372

UNITED STATES PATENT OFFICE.

FRED FORREST PEASE, OF EAST BRAINTREE, MASSACHUSETTS, ASSIGNOR TO F. F. PEASE INC., OF BOSTON, MASSACHUSETTS, A CORPORATION OF MASSACHUSETTS.

GRADING AND SORTING APPARATUS.

Application filed April 4, 1923, Serial No. 629,876. Renewed April 22, 1926.

The present invention relates to apparatus for grading, sorting and cleaning various kinds of nuts, beans, corn, rice, or similar materials which vary in size.

It is desirable that mechanism be provided for more or less accurately grading or sorting nuts and similar materials especially in cases where these materials are to be subsequently roasted or cooked. Where cocoa beans or almonds for example are to be roasted it is a matter of considerable importance that nuts or beans which are smaller or thinner than predetermined sizes shall be graded out from the mass in order to prevent excessive roasting or cooking of the smaller or thinner nuts. The grading or sorting of these materials to a uniform size also increases the salability, owing to the superior appearance presented by the uniformly graded mass.

One object of the present invention is to provide an improved form of apparatus for rapidly and efficiently grading or sorting nuts, beans and similar materials without breaking or otherwise damaging the materials subjected to the treatment.

A further object of the invention is to provide means for cleaning the materials to be sorted of dirt and similar foreign matter, together with loose husks or skins which may adhere to the material.

With these and other objects in view the various features of the invention consist in certain novel features of construction, combinations and arrangements of parts hereinafter described and claimed, the advantages of which will be obvious to those skilled in the art from the following description.

In the accompanying drawings illustrating the preferred form of the invention Fig. 1 represents a side elevation partly in section of an apparatus embodying the various features of the invention; Fig. 2 is a top plan view of the apparatus shown in Fig. 1; Fig. 3 is a detail illustrating a section on the line 3—3 of Fig. 2; Fig. 4 is a partial side elevation of the apparatus; Fig. 5 is a detail illustrating a section on the line 5—5 of Fig. 2; and Fig. 6 is a detail illustrating a portion of the mechanism for cleaning the materials to be sorted.

The illustrated embodiment of the invention discloses a machine which has particular utility in connection with the grading or sorting of cocoa beans, almonds and similar materials. This machine comprises generally a revolving table which presents a moving surface across which the nuts are caused to move through the action of centrifugal force. A grading or measuring slot is provided adjacent the periphery of the surface and is so designed that nuts of less than a predetermined size or thickness shall pass through the slot, whereas nuts greater than the predetermined thickness are caused to travel about the periphery of the table until discharged into a suitable outlet. The primary purpose of the machine shown in the illustrated embodiment of the invention is to grade cocoa beans or almonds which may vary substantially in thickness, although the other dimensions, that is the length and width of the nuts, may be approximately the same. To this end the rotation of the table is sufficiently rapid to cause a progressive movement of the nuts from the central portion of the table outwardly toward the periphery without, however, violently agitating the nuts or causing them to turn over or roll on the surface of the table. The normal tendency of the nuts is to lie in a flat position upon the table so that the thinnest portion of the nut is presented to the grading slot and the latter becomes in effect a means for grading nuts which vary in thickness although the length and breadth may be substantially the same. The apparatus is provided in addition with a suitable form of feeding device which progressively deposits the nuts to be sorted at a suitable point on the revolving surface, this feeding device being so adjusted that the nuts are not permitted to pile up substantially at the point of deposit. According to the present invention, a progressive sorting or grading is accomplished through the provision of a series of revolving surfaces, each having a measuring slot of different width. The first surface, together with its cooperating slot, may remove the thinnest nuts from the mass and thereafter each successive surface may be employed for removing slightly thicker or plumper nuts until the entire mass has been graded or sorted as desired. In addition to the mechanism for grading or sorting nuts varying in thickness the apparatus is provided with means for removing dirt and foreign matter, together with loose skins or husks which may adhere to the nuts. According to the present invention this is conveniently accomplished by providing an air suction in the passage into which the nuts are discharged after sorting, this suction serving to remove pieces of broken nuts and light husks, skins and other foreign matter adhering thereto or mixing therewith.

It will be evident to those skilled in the art that although the illustrated embodiment of the invention is described as having particular utility in connection with the sorting or grading of nuts and similar materials which vary in thickness certain features of the invention are well applicable to the grading or sorting of other objects, such as fruit, which vary materially in size.

The apparatus is provided with a frame 10 mounted upon a base 12 and having upper and lower arms 14 and 15 respectively, which provide bearings for a shaft 17. A series of flat tables 18, 19 and 20 are mounted at intervals upon the shaft and are revolved at the desired rate of speed by a pulley 22 secured to the lower portion of the shaft and driven from any suitable source of power (not shown). Each of these tables has a flat horizontal upper surface entirely smooth except for a series of slots or ribs as indicated at 25 which are intended to cause a progressive movement of the nuts with the table after the nuts have engaged with the closing flange or guard at the periphery of the table. The nuts or similar materials are initially deposited upon the surface of the upper table 18 through a deposit chute 26 projecting downwardly from a magazine 28, the discharge of nuts from the magazine being controlled through a slide gate 30. The outer periphery of the revolving surface is surmounted by a guard ring indicated generally at 32 having a depending flange 34, the lower edge of which is positioned at a predetermined height above the revolving surface to provide a measuring slot for grading or sorting nuts which engage therewith. The guard member is in addition provided with an inwardly and upwardly extending flange which tends to prevent the accidental discharge of nuts over the top of the guard member. In order to insure an accurate adjustment of the measuring slot throughout the entire periphery of the table, the guard member as a whole is supported by a plurality of adjustable members 38. Each of these members comprises a threaded stem secured to the guard member at its lower end and passing loosely through a supporting arm 40, the stems being threadedly engaged at their upper ends above the arms by adjusting members 42 which serve to raise or lower the point of support in order to compensate for possible variations in height of the measuring slot. The guard member is interrupted at 50 to provide a discharge passage for those nuts which have not passed through the grading slot. In order to insure the entrance of nuts into the discharge passage 50, a baffle or partition 52 extends partway across the surface of the table from one side of the passage, as indicated clearly in Fig. 2. In the actual operation of the apparatus, the nuts to be sorted are discharged onto the table at 26, as indicated in Fig. 2, and are thereafter caused to slide across the surface of the table, due to the rotation until engaged by the overhanging flange 35. As the nuts pass about the periphery of the table in engagement with the flange 35 nuts of less than a predetermined thickness pass freely through the measuring slot into the annular passage 55 at the outer portion of the table. The remaining mass of nuts of a thickness greater than the height of the slot is progressively moved about the table until the discharge passage 50 is encountered. From this discharge passage the nuts move into a downwardly sloping chute 60 from which they are discharged onto the next lower table, as indicated in Fig. 1. The grading process previously described in connection with the first table is repeated upon this table which is provided with a similar guard member 32 and a measuring slot of slightly greater height. The mass of nuts in passing through the measuring slot upon the second table is again discharged into a chute 65 and deposited upon a third table where the final grading takes place, the mass of nuts remaining upon the table being thereafter discharged into a chute 67.

Nuts or similar materials under treatment which pass through the various grading or measuring slots are received in annular passages 55 and are thereafter subjected to a cleaning treatment as they are progressively moved through the passage by the outer periphery of the revolving table. To this end, each of the tables is provided adjacent its outer edge with a comparatively narrow annular slot 70 affording communication between the passage 55 and the air passage 72 formed beneath the outer portion of the table. A series of strengthening and connecting ribs 71, as indicated in Figs. 5 and 6, project at intervals across the bottom of the slot 70. In order to insure the discharge of materials collected in the annular passages 55, a transverse partition 73 is formed in each of the passages, as indicated in Fig. 5, and serves to divert the materials into the discharge chutes. The partition is provided with a recessed portion 75 which permits materials engaged by the upper edge of the measuring slot to be moved along with the table. Each of the air passages 72 is connected through a branch duct 74 with a main air duct which in turn may be connected with a suitable source of suction, not shown. Air is admitted to the passages 55 through a series of openings 76 formed in the guard member and controlled in size by a slide valve 80. With this construction a continuous draft of air passes through the chamber 55 with sufficient force to remove dirt and loose particles of skin adhering to the nuts and draw this foreign material through the slot 70. It will be observed that the slot is of insufficient width to permit the passage of whole nuts therethrough. The nuts passing through the measuring slot into the chambers or passages 55 are discharged into a series of chutes 82, 84 and 86 for collection in suitable receptacles.

It will be evident to those skilled in the art that the speed of movement of the moving surfaces should be sufficient to cause a progressive movement of the material under treatment toward the periphery and into contact with the measuring slot without, however, causing such a violent movement of the material that it will be packed solidly against the slot or caused to do more than slide freely in the desired direction. A speed of the table sufficient to accomplish this desired result may be readily determined according to the character of the materials under treatment.

While it is preferred to employ the specific construction and arrangement of parts shown and described it will be understood that this construction and arrangement is not essential except so far as specified in the claims and may be changed or modified without departing from the broader features of the invention.

The invention having been described, what is claimed is:

1. A grading and sorting apparatus comprising means for forming a peripheral grading slot of predetermined width, means for moving articles by centrifugal force against the slot and for maintaining the articles in moving contact with the slot for a substantial period, and means for collecting and discharging articles too large to pass through the slot.

2. A grading and sorting apparatus comprising a revolving table, a rail positioned above the table to provide a measuring slot extending about the peripheral margin of the table, means for depositing articles upon the surface of the table, and means for revolving the table to direct articles by centrifugal force against the measuring slot.

3. A grading and sorting apparatus comprising a revolving table, a guard member extending about the periphery of the table and located above the surface to provide a measuring slot of predetermined width, means for adjusting the rail with respect to the table, means for depositing articles upon the table to direct articles by centrifugal force toward the slot, and means for revolving the table.

4. A grading and sorting apparatus comprising a revolving table, an annular ring extending about the outer periphery of the table and designed to provide a comparatively narrow measuring slot communicating with an annular chamber above the outer periphery of the table, means for revolving the table, and means for creating a draft of air through the annular chamber to remove dust, dirt and other foreign material from the articles under treatment.

5. A grading and sorting apparatus comprising a table revolving about a vertical axis having a substantially horizontal surface, a ring positioned above the table and extending about the outer periphery to provide an annular chamber and a measuring slot of predetermined width, means for adjusting the position of the ring with respect to the table, means for revolving the table, and means for depositing articles upon the surface of the table.

6. A grading and sorting apparatus comprising a table, means for revolving the table, a ring spaced away from the surface of the table to provide a measuring slot of predetermined width, a plurality of adjustable supports for the ring, a slot formed in the outer periphery of the table, and means for creating a draft of air through the slot.

7. A grading and sorting apparatus comprising a revolving table having a substantially horizontal surface, means for driving the table, a guard flange extending about the periphery of the table and spaced away from the surface of the table to provide a measuring slot, an overhanging flange mounted upon the guard, a discharge chute, and means for directing articles under treatment into the discharge chute.

8. A grading and sorting apparatus comprising a series of superimposed tables revolving about a vertical axis, a peripheral guard flange associated with each of the tables in a manner to provide a measuring slot of predetermined width, the slots progressively increasing in width on each lower table, and means for directing articles under treatment from one table to the next adjacent table beneath.

9. A grading and sorting apparatus comprising a moving surface, means for depositing articles under treatment upon the moving surface, means for providing a measuring slot of predetermined width with relation to the moving surface and communicating with the receiving chamber, and means for creating an artificial draft of air through the chamber.

10. A grading and sorting apparatus comprising a series of rotating tables, means for revolving the tables at a sufficient rate of speed to cause articles deposited thereon to be moved toward the periphery by centrifugal force, means for forming a measuring slot of uniform width extending about the peripheral margin of each table, means for forming a discharge passage connecting the peripheral portion of one table with the the surface of the next succeeding table and adapted to receive articles not passing through the measuring slot, and means for collecting articles passing through the measuring slots.

11. Apparatus of the character described comprising a moving surface, means for forming a grading slot of predetermined dimensions associated therewith and designed to gauge the size of particles moved thereagainst by the surface, means for forming a cleaning slot designed to pass therethrough only relatively finer solid matter than that passing through the grading slot, and means for creating an artificial draft of air through the cleaning slot.

12. Apparatus of the character described comprising a revolving surface, means for forming a peripheral grading slot surrounding the surface and adapted to engage articles moved into contact therewith by the revolving of the surface, means for forming a comparatively narrow cleaning slot beyond the grading slot, and means for creating an artificial draft of air through the cleaning slot for removing relatively finely-divided, solid matter from the graded materials and the revolving surface.

13. Apparatus of the character described comprising a series of moving surfaces, means for forming a series of grading slots of progressively diminishing width associated therewith, means for conveying articles successively to the surfaces, means for forming a series of cleaning slots associated with the grading slots, and means for introducing an artificial draft of air through each of the cleaning slots to remove finely-divided, solid matter from the surfaces and graded articles.

FRED FORREST PEASE.